(12) United States Patent
Fitch et al.

(10) Patent No.: US 7,761,381 B1
(45) Date of Patent: Jul. 20, 2010

(54) METHOD AND SYSTEM FOR APPROVING OF FINANCIAL TRANSACTIONS

(75) Inventors: Todd Matthew Fitch, Santa Clara, CA (US); James R. Del Favero, Redwood City, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 11/932,325

(22) Filed: Oct. 31, 2007

(51) Int. Cl.
*G06Q 40/00* (2006.01)

(52) U.S. Cl. .................................................. 705/44
(58) Field of Classification Search ............... 235/380; 370/230; 435/6; 463/25; 506/17; 700/126, 700/136; 705/1–45; 714/16; 718/100
See application file for complete search history.

(56) References Cited

U.S. PATENT DOCUMENTS

| | | | | |
|---|---|---|---|---|
| 7,600,676 | B1* | 10/2009 | Rados et al. ............... 235/380 |
| 2002/0025796 | A1* | 2/2002 | Taylor et al. ............... 455/406 |
| 2002/0123938 | A1* | 9/2002 | Yu et al. ...................... 705/26 |
| 2003/0191711 | A1* | 10/2003 | Jamison et al. .............. 705/40 |
| 2004/0230539 | A1* | 11/2004 | Praisner ....................... 705/74 |
| 2005/0177510 | A1* | 8/2005 | Hilt et al. .................... 705/40 |
| 2005/0177517 | A1* | 8/2005 | Leung et al. ................. 705/64 |
| 2006/0190351 | A1* | 8/2006 | Dennis ......................... 705/26 |
| 2008/0208762 | A1* | 8/2008 | Arthur et al. ................ 705/79 |
| 2008/0270301 | A1* | 10/2008 | Jones et al. .................. 705/41 |

OTHER PUBLICATIONS

Customer efficiency: Concept and its impact on e-business management, Xue, Mei; Harker, Patrick T, Journal of Service Research: JRS v4n4 pp. 253-267, May 2002.*
Mobiclear: Security With Simplicity; copyright 2006 MobiClear Ltd.; www.mobiclear.com; accessed on Oct. 29, 2007; 5 pages.
* cited by examiner

*Primary Examiner*—James P Trammell
*Assistant Examiner*—Tien C Nguyen
(74) *Attorney, Agent, or Firm*—Osha • Liang LLP

(57) ABSTRACT

A method for approving of a financial transaction, that includes receiving transaction information related to the financial transaction, wherein the transaction information comprises identification of a financial account controlled by a consumer and an amount of the financial transaction, accessing a policy for the financial account based on a context of the financial transaction, wherein the policy is defined by the consumer, triggering an approval request based on a determination that the amount is above a limit set by the policy, sending the approval request to a mobile device of the consumer, receiving an approval response based on the approval request from the mobile device of the consumer, and approving the transaction based on the approval response.

21 Claims, 7 Drawing Sheets

METHOD AND SYSTEM FOR APPROVING OF FINANCIAL TRANSACTIONS

BACKGROUND

Payment devices, such as credit cards and debit cards, allow consumers to perform financial transactions using the financial account associated with the payment device. For example, a consumer may pay for groceries with a debit card that is linked to the consumer's checking account. In this case, the payment device identifies the financial account and, accordingly, the financial account is debited by the amount of the financial transaction.

Occasionally, an unauthorized person may perform fraudulent financial transactions with the financial account, such as by using a stolen the payment device. Currently, multiple different techniques are used to prevent fraud. For example, a merchant may compare a signature on the payment device with a signature provided by the person performing the transaction. Alternatively, the merchant may request identification of the person performing the transaction and compare the identification with a name on the payment device.

Fraud prevention may also be performed by financial institutions. For example, a financial institution may have a general rule for all financial accounts managed by the financial institution that a certain number of gas purchases in a single day triggers a fraud alert. Because of the fraud alert, the consumer may not be able to perform financial transactions with the financial account until the consumer contacts the financial institution. Specifically, all financial transactions performed with a financial account having an associated fraud alert are denied.

SUMMARY

In general, in one aspect, the invention relates to a method for approving of a financial transaction, that includes receiving transaction information related to the financial transaction, wherein the transaction information comprises identification of a financial account controlled by a consumer and an amount of the financial transaction, accessing a policy for the financial account based on a context of the financial transaction, wherein the policy is defined by the consumer, triggering an approval request based on a determination that the amount is above a limit set by the policy, sending the approval request to a mobile device of the consumer, receiving an approval response based on the approval request from the mobile device of the consumer, and approving the transaction based on the approval response.

In general, in one aspect, the invention relates to a user interface displayed on a mobile device for approving of a financial transaction, that includes an amount field associated with the financial transaction comprised in an approval request, a merchant field associated with the financial transaction comprised in the approval request, wherein the approval request is received by the mobile device when the amount is above a limit set by a policy, wherein the policy is defined by a consumer, wherein the mobile device is associated with the policy, and wherein the policy is obtained based on a context of the financial transaction, wherein the consumer sends an approval response with approval of the financial transaction using the mobile device, and wherein the financial transaction is approved at a point of sale based on the approval response.

In general, in one aspect, the invention relates to a system for approving of a financial transaction, that includes a policy data store that includes a policy, and a policy module configured to receive transaction information related to the financial transaction, wherein the transaction information comprises identification of a financial account controlled by a consumer and an amount of the financial transaction, access a policy for the financial account based on a context of the financial transaction, wherein the policy is defined by the consumer, trigger an approval request based on a determination that the amount is above a limit set by the policy, send the approval request to a mobile device of the consumer, receive an approval response based on the approval request from the mobile device of the consumer, and approve the transaction based on the approval response.

In general, in one aspect, the invention relates to a computer readable medium that includes computer readable program code embodied therein for causing a computer system to receive transaction information related to the financial transaction, wherein the transaction information comprises identification of a financial account controlled by a consumer and an amount of the financial transaction, access a policy for the financial account based on a context of the financial transaction, wherein the policy is defined by the consumer, trigger an approval request based on a determination that the amount is above a limit set by the policy, send the approval request to a mobile device of the consumer, receive an approval response based on the approval request from the mobile device of the consumer, and approve the transaction based on the approval response.

Other aspects of the invention will be apparent from the following description and the appended claims.

DETAILED DESCRIPTION

Figure 1:
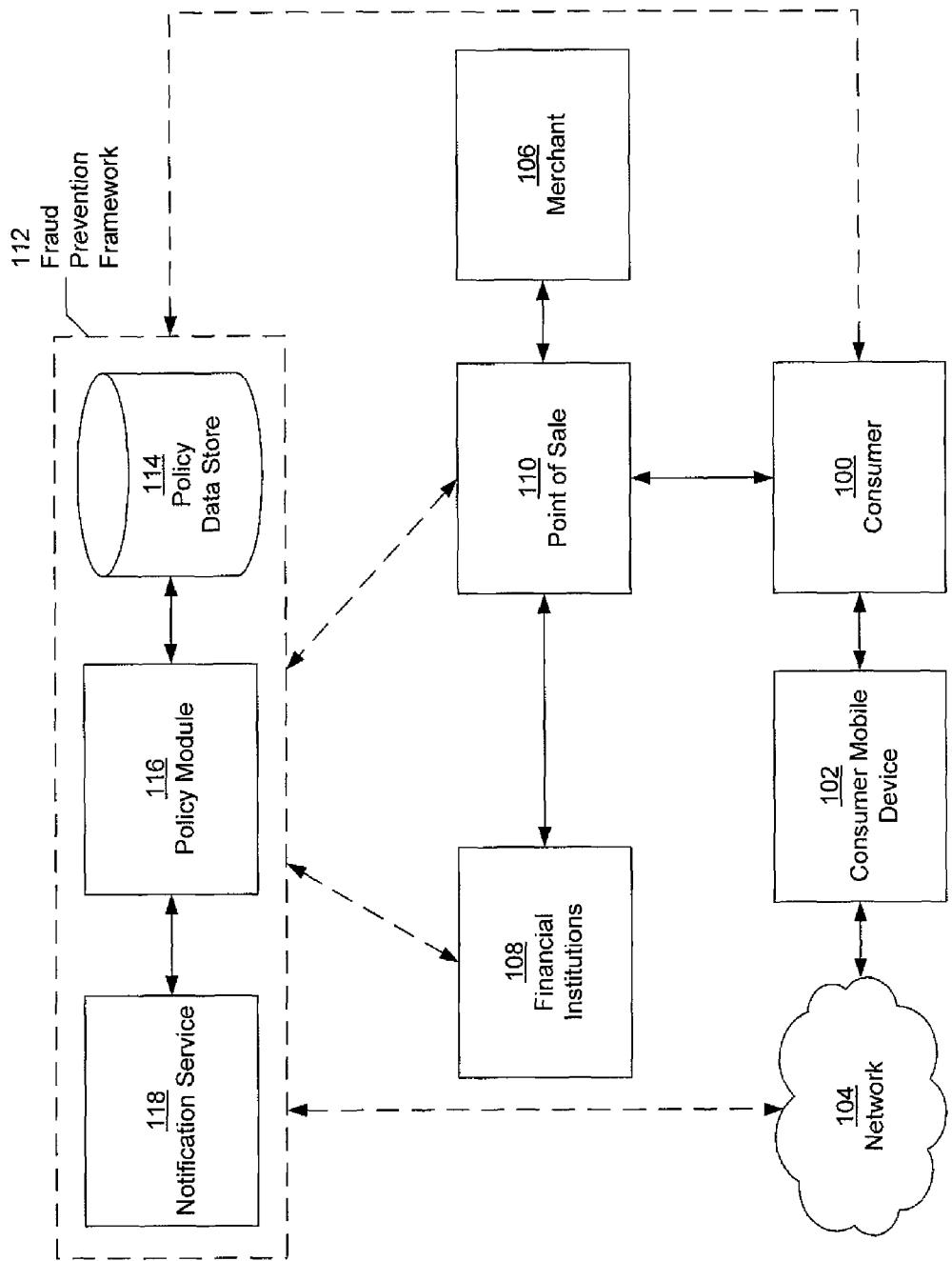
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for fraud prevention. Specifically, embodiments of the invention allow a consumer to define one or more policies to prevent fraud. Each policy defines when a consumer should be notified about the existence of a financial transaction before the financial transaction is completed. When the consumer receives notification, the consumer may determine whether the financial transaction should be allowed or denied. Thus, when the consumer suspects a transaction is fraudulent, the consumer may be notified before the transaction is approved at the point of sale and deny the transaction.

FIG. 1 shows a schematic diagram of a system in accordance with one or more embodiments of the invention. As shown in FIG. 1, the system includes a consumer mobile device (102), a network (104), one or more financial institutions (108), a point of sale (110), and a fraud prevention framework (112). Each of these components is described below. Further, the system is configured to interact with a consumer (100) and a merchant (106).

A consumer (100) is any individual, group of related individuals, or a business entity that is associated with a financial account (not shown) (described below). For example, the consumer (100) may be a family, a business, or a single individual. The consumer (100) may also include an agent or representative acting on behalf of the consumer. For example, if the consumer (100) is a business, then the consumer may include employees or agents of the business that perform financial transactions on behalf of the business and manage the financial account associated with the business.

In one or more embodiments of the invention, the consumer (100) interacts with the system using a consumer mobile device (102). The consumer mobile device (102) is any portable device configured to communicate via a network (104) (e.g., telephone network, local area network, wide area network, any other communication network, and/or any combination thereof). For example, the consumer mobile device (102) may be a pager, cellular telephone, personal digital assistant, or any other transportable device that may be used for communication.

A merchant (106) is the entity with which the consumer (100) is performing the financial transaction. Specifically, the merchant (106) is selling the good or service to the consumer (100). One skilled in the art will appreciate that the merchant (106) may not be physically present during the financial transaction. For example, the consumer (100) may perform the financial transaction via an Internet website or with a kiosk owned and/or operated by the merchant (106).

In one or more embodiments of the invention, the financial institutions (108) facilitate the exchange of money in the financial transaction. For example, the financial institutions may include banks, credit card companies, independent sales organizations, or any other entity capable of transferring funds. Specifically, the financial institutions (108) include a financial institution for the consumer (100), a financial institution for the merchant (106), and any intermediate institution that facilitates the exchange of money from the consumer (100) to the merchant (106). Those skilled in the art will appreciate that the consumer and the merchant may use the same financial institution.

In one or more embodiments of the invention, the merchant may have a financial account at a financial institution, where the financial institution includes functionality to receive and process all credit and debit transactions for the merchant (106).

Further, the consumer (100) may use a financial institution to manage the consumer's financial account. Specifically, the consumer's financial institution includes functionality to determine whether the consumer (100) has sufficient funds or credit available for a given financial transaction, authorize a financial transaction for the financial account, and debit the financial account, e.g., as part of the financial transaction. The financial account may be a credit card account, a bank account, line of credit, an investment account, or any other type of financial account for which a consumer (100) has monetary resources, such as a money or credit.

In one or more embodiments of the invention, the financial account is associated with a payment device (not shown). In one or more embodiments of the invention, the payment device is a device used by the consumer (100) to transfer funds to a merchant. Examples of payment devices include, but are not limited to a credit card, debit card, smart pass, a check, and an electronic check. The payment device may also include the name of the consumer and security features, such as a security code. The payment device and the financial account may be further associated with a pin number and other such tools to secure the payment device.

In one or more embodiments of the invention, the financial transaction is performed at a point of sale (112). The point of sale (112) is a location at which a device, which includes functionality to receive/extract information from the payment device, sends the information to the merchant's financial institution for processing. Examples of point of sale devices include, but are not limited to, a cash register and a credit card machine.

Continuing with FIG. 1, in one or more embodiments of the invention, the fraud prevention framework (112) includes functionality to monitor financial transactions conducted using a financial account associated with the consumer and determine whether to notify the consumer of a particular financial transaction. The fraud prevention framework (112) may be located, for example, at one of the financial institutions (108), at the point of sale (110), or as a separate component within the system. In one or more embodiments of the invention, the fraud prevention framework (112) includes a policy data store (114), a policy module (116), and a notification service (118).

In one or more embodiments of the invention, the policy data store (114) is configured to store one or more policies as well as contact information for the consumer (100). Each policy corresponds to a rule (or set of rules) defined by a consumer, which specifies when a consumer (100) is required to approve a financial transaction. In one or more embodiments of the invention, the policy further includes an identifier of the financial account, one or more policy parameters, and a monetary limit. The policy parameters specify which financial transactions are governed by the policy. For example, the parameters may include a name of a merchant, a category of the merchant (e.g., household services, car repair, restaurant, home and garden retailers, electronic retailers, etc.), a location of the transaction (e.g., city, state, or country), a distance from a physical address of the consumer (e.g., billing address, residence address, and/or information used to determine the distance), a type of financial transaction (e.g., in person sale, phone, Internet sale), a time of the transaction, a name of the individual performing the financial transaction, or any other such parameters.

In one or more embodiments of the invention, the monetary limit specifies a maximum amount for a single financial transaction. In one or more embodiments of the invention, the limit is a positive number. When the financial transaction has an amount that is greater than the monetary limit (i.e., the amount is outside of the limit), then the consumer is notified. For example, a policy may specify a limit of one hundred dollars. In the example, when a financial transaction occurs that would result in the consumer's account being debited by more than one hundred dollars, the consumer is sent an approval request.

Additionally, in one or more embodiments of the invention, the policy may be based on the context of the transaction in relation to the consumer. Specifically, the policy may include a location of the mobile device of the user as compared to the location of the point of sale. For example, the policy may specify to not trigger an approval request when the consumer's mobile device is located at (or within a certain distance from) the physical location of the point of sale (as defined by, for example, the address of the merchant). Further, the context of the transaction may include the context of previous financial transactions that the consumer approved. For example, the policy may specify that if the consumer approves of a gas purchase in a city that is not the residence of the consumer, then financial transactions on the same day in the same city do not require approval requests. Thus, if the consumer is on vacation in a city that is not the residence of the consumer, then the consumer is sent the approval request once.

In one or more embodiments of the invention, the context of the transaction may also be related to the email address of the consumer. In particular, the policy may specify that the email address used in Internet purchases should be compared against an email address of the consumer. For example, when a user attempts to perform an online transaction, the user may specific a credit card account as well as an email address where the online merchant should send the receipt of the online transaction. During the approval process of the credit card account, the Fraud Prevention Framework (112) compares the email address the user entered for the particular transaction against the email address associated with the credit card account (e.g., the email address to which the credit card company sends the user's electronic credit card statements). If the aforementioned emails do not match, then the individual that controls the credit card account (which may not be the user, if the user is fraudulently using the credit card account) is sent an approval request.

Further, in one or more embodiments of the invention, the policy defined by the consumer may be an adaptive policy. An adaptive policy changes when approval requests are trigger based on the purchasing habits of the consumer. For example, the consumer may specify an adaptive policy that for grocery stores within a certain distance of the consumer's residence, the policy should initially trigger an approval request on all transactions and learn the amount that the consumer usually spends at each store. In such cases, the policy may trigger approval requests based on knowledge learned through the adaptation. Thus, the consumer may define the policy at a desired granularity and then allow the policy to adapt to the consumer's spending habits and approval habits.

In one or more embodiments of the invention, each policy may be composed of a set of rules. The set of rules may be ordered according to the restrictiveness of the rule. For example, rule X may be used for the first financial transaction covered by the policy. Rule Y, rather than the rule X, may be used for a second financial transaction covered by the policy based on whether the first rule triggered an approval request for the first financial transaction and whether the consumer approved or denied the first financial transaction if the approval request was triggered. Thus, policies allow for situations in which the consumer has spending habits that groups financial transactions with specific parameters, and for situations in which the consumer has spending habits that performs only one financial transaction occasionally with the specific parameters.

The following is an example in accordance with one or more embodiments of the invention. This example is not intended to limit the scope of the invention. Consider the scenario in which a consumer performs occasional shopping sprees in which the consumer visits multiple different clothing stores within a two day period. Otherwise, the consumer performs only one financial transaction at a time. In such scenario, the consumer may create a policy that applies to merchants selling clothing goods. Rules in the policy may be ordered according to when the rule triggers the approval request. The first rule that is used may state an approval request is sent for amounts above zero dollars at a clothing store. A second rule may state that an approval request is sent only when the amount is above fifty dollars at a clothing store within the two days of the first transaction. A third rule may state that an approval request is sent only when the amount is above six hundred dollars at a clothing store within the two days of the first transaction.

Continuing with the example, because of the first rule, an approval request is sent to the consumer for the first financial transaction at a first clothing store. If a second financial transaction is performed at a second clothing store within two days and the consumer approved of the first financial transaction, then the second rule of the policy is applied. Thus, only if the second financial transaction is above fifty dollars, is the consumer is sent an approval request. If an approval request is sent for the second financial transaction and the consumer approves of the second financial transaction, then upon the performance of a third financial transaction at a clothing store, the third rule is applied. In the example, since the consumer explicitly approved of the first two financial transactions, then the consumer is most likely in the middle of a two day shopping spree at a variety of clothing stores. Therefore, subsequent financial transactions within the two days are most likely legitimate and should have a higher limit for when an approval request is sent.

The following is another example in accordance with one or more embodiments of the invention. This example is not intended to limit the scope of the invention. Consider the scenario in which the consumer purchases jewelry every few months while on a date with his wife. Because the consumer does not want to interrupt the date, the consumer may specify a first rule for a jewelry store policy that has a limit of five hundred dollars. However, because a second purchase of jewelry at a jewelry store is unusual within three months, the consumer may specify a limit of one hundred dollars at the jewelry store within three months for a second rule of the jewelry store policy. Thus, when the policy is applied, the consumer is not interrupted during the date, and a thief is prevented from performing multiple purchases at jewelry stores with the consumer's financial account.

Continuing with the discussion of FIG. 1, in one or more embodiments of the invention, multiple policies may be defined for a single financial account in which each policy has different policy parameters and monetary limits. For example, a single checking account may be associated with the following policies: (i) policy 1—this policy specifies a monetary limit of one hundred dollars for groceries and (ii) policy 2—this policy specifies a monetary limit of two hundred dollars for clothing stores. In another example, the checking account may be associated with two policies, where the monetary limits set by each policy is predicated whether the consumer is purchasing the product over the Internet or at a physical location (e.g., a merchant's store in a mall).

In one or more embodiments of the invention, the financial account is associated with one or more default policies. In one or more embodiments of the invention, the default policies define whether to reject or deny a financial transaction or contact an alternate approver in the event that the consumer cannot be contacted. The default policy (or policies) may be applied to all (or a portion of) the financial transactions associated with the financial account. In one or more embodiments of the invention, the default policy(or policies) is only applied after an attempt is made to contact the consumer and the consumer has not responded. In one or more embodiments of the invention, a particular default policy may be associated with a given policy (non-default policy) as opposed to a given financial account and may be applied to all financial transactions and financial accounts associated with the non-default policy when the consumer cannot be contacted.

Continuing with FIG. 1, the policy module (116) includes functionality to access the policy data store (114), obtain the appropriate policy(or policies), and determine whether to notify the consumer (100) based on a policy(or policies). In order to determine whether to notify the consumer, the policy module (116) may also include functionality to determine a category of the merchant in the financial transaction. For example, the policy module may access a merchant category repository (not shown) that defines a category (or categories) for each merchant (106).

The notification service (118) includes functionality to format an approval request according to the consumer mobile device (102) and send the approval request to the consumer (100). In one or more embodiments of the invention, the approval request may have a standardized format that includes information about the financial transaction, such as the name of the merchant, the amount of the financial transaction, the category of the merchant (optional), and information about the financial transaction which caused the generation of the approval request. The approval request may also include a response mechanism, such as a button, a phone number, a reply-to email address, and/or a website link. The notification service (118) may include functionality to receive the approval response and send the approval response to the appropriate components within the system (e.g., financial institution (108), fraud prevention framework (112), and point of sale (110)).

Figure 2:
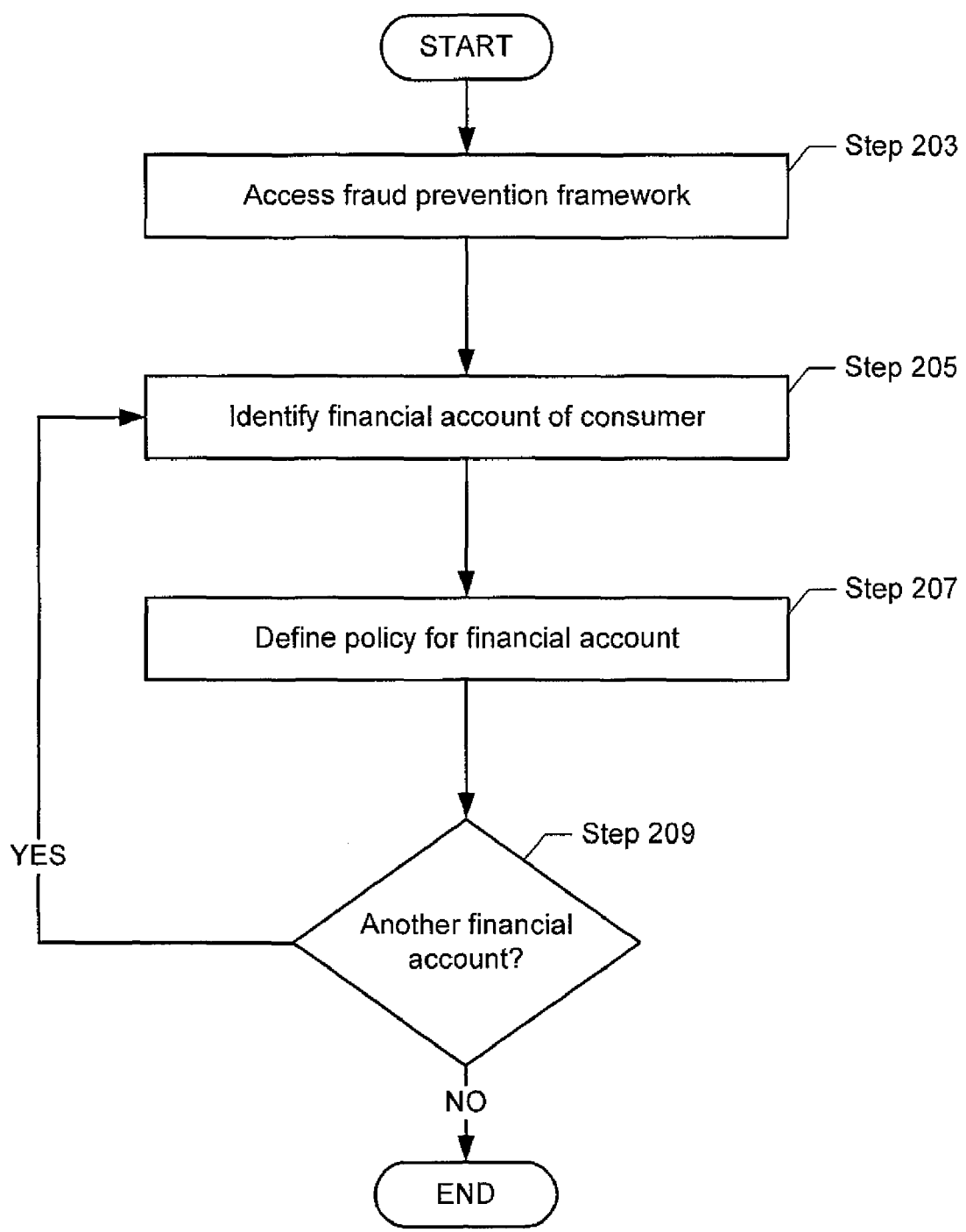
FIGS. 2-4 show flowcharts of a method in accordance with one or more embodiments of the invention.
Figure 3:
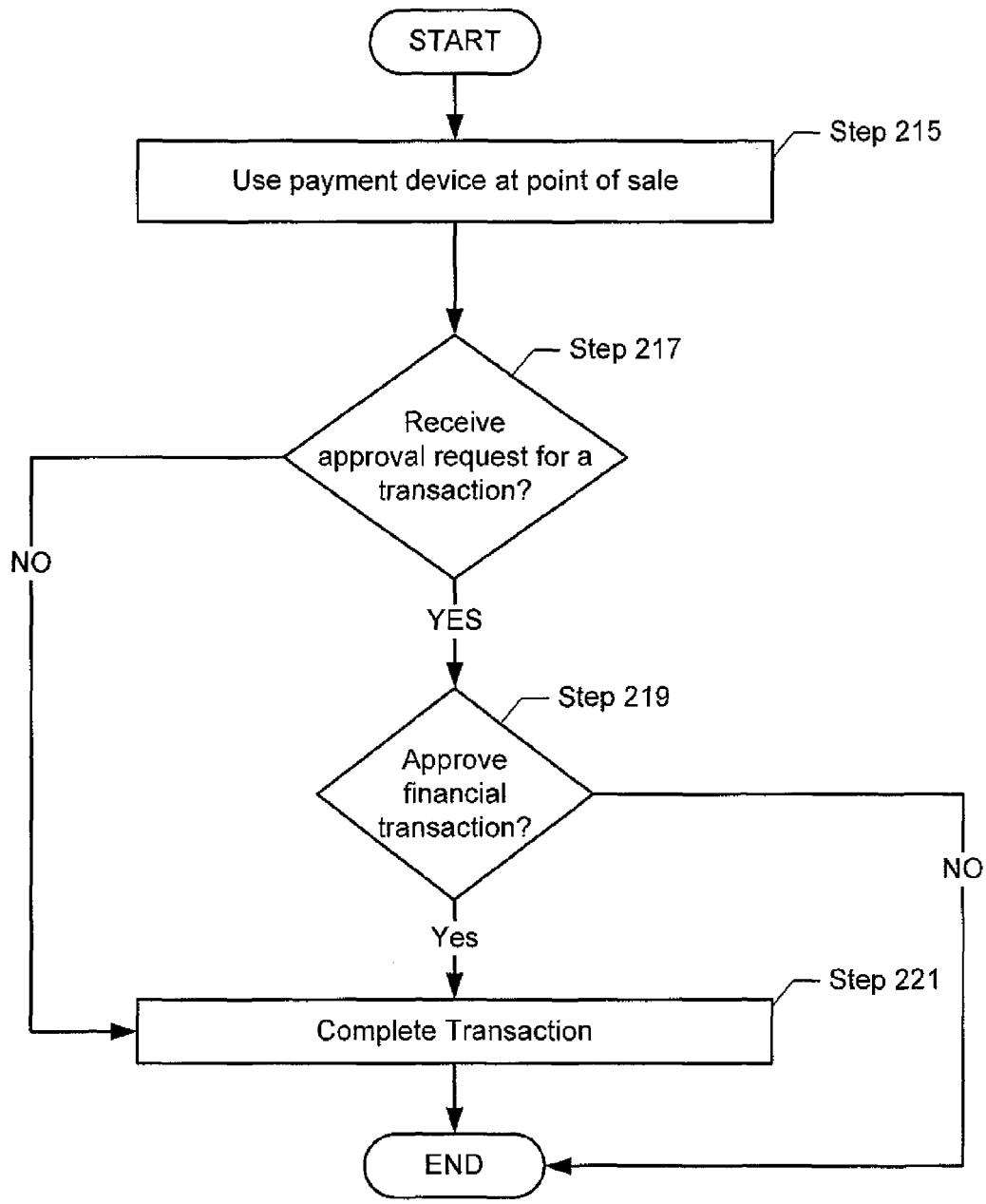
Figure 4:
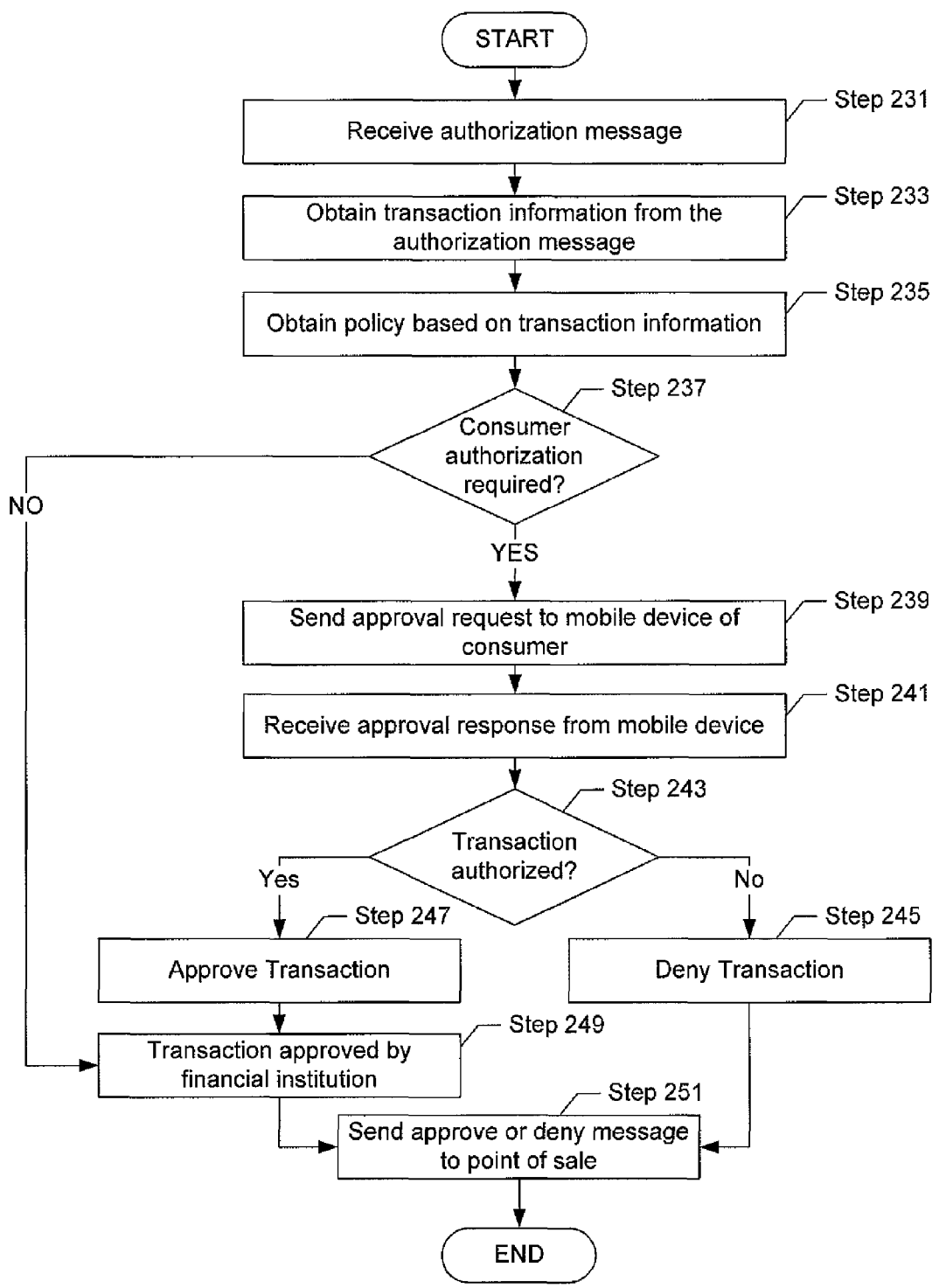

FIGS. 2-4 show flowcharts of a method in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

FIG. 2 shows a flowchart of a method for a consumer to define a policy in accordance with one or more embodiments of the invention. Initially, the consumer accesses the fraud prevention framework (Step 203). The consumer may access the fraud prevention framework using a website, calling a telephone number to access an automated system or to speak to a representative of the fraud prevention framework, or performing any other method known in the art. The manner in which the consumer accesses the fraud prevention framework may be dependent on the location of the fraud prevention framework within the system. For example, if the fraud prevention framework is a part of the financial institution, then the consumer may access the fraud prevention framework by accessing the website of the financial institution.

Regardless of how the fraud prevention framework is accessed, the consumer identifies a financial account (Step 205). For example, the consumer may submit a payment device number of the payment device that identifies the account or select the account from a list of financial accounts, or perform any method known in the art for identifying a financial account.

Further, the consumer defines a policy for the financial account (Step 209). Defining the policy may include, but is not limited to, specifying the financial account (e.g., the financial account identified in Step 205) to associate with the policy, specifying one or more financial transaction for which the policy applies, and specifying one or more monetary limits.

The following is an example of a policy in accordance with one or more embodiments of the invention. This example is not intended to limit the scope of the invention. Consider the scenario in which a consumer wants to create a policy where the consumer is notified for charges at gas stations exceeding fifty dollars. In order to specify such a policy, the consumer may select "service station" from a drop down list of categories of merchants and types "50.00" into a field for the monetary limit. Once the policy is defined, the consumer may submit the policy to the fraud prevention framework. By submitting the policy, the consumer is notified of future financial transactions governed by the policy.

Similarly, the consumer may also define default policies for the financial account. In order to define the default policy, the consumer may specify that the policy is a default policy and whether to approve or deny financial transactions. In one or more embodiments of the invention, the consumer may also include a limit and a merchant name or a category of merchant in the default policy.

In one or more embodiments of the invention, a determination may be made whether to define a policy for another financial account (Step 209). For example, the consumer may determine whether the consumer wants to specify a separate set of policies for each of the consumer's financial accounts. If the consumer determines to define a policy for another financial account, then the consumer identifies the next financial account (Step 205). Thus, the consumer may continue to define policies for each of the consumer's financial accounts.

FIG. 3 shows a flowchart of a method for a consumer to authorize a financial transaction in accordance with one or more embodiments of the invention. Initially, a payment device is used at the point of sale (Step 215). The payment device may be used, for example, by the consumer, a representative of the consumer, or nefarious or unscrupulous individual. Using the payment device at the point of sale may be performed according to any technique known in the art.

Next, a determination is made about whether an approval request is received for the financial transaction (Step 217). Specifically, before the charge is approved at the point of sale, the consumer may receive an approval request. For example, a cellular telephone of the consumer may receive a text message with the approval request. Because the consumer defines the policy, the consumer may be able to anticipate approval requests for non-fraudulent transactions and expect the notification on the consumer mobile device. However, the consumer is notified of fraudulent transactions before the fraudulent transactions affect the consumer's financial account.

If the consumer receives an approval request, then the consumer determines whether to approve of the financial transaction (Step 219). If the consumer approves of the financial transaction, then the consumer sends an approval response (i.e., approval message), which indicates approval of the financial transaction. The one or more embodiments of the invention, the financial transaction can only be completed if the consumer sends the approval response, assuming that there is no default policy which authorizes the request when the consumer cannot be contacted.

Accordingly, if the consumer sends the approval response, then the financial transaction is completed (Step 221). The consumer may send the approval response via text message, email, a telephone call, or using any other communication mechanism. One skilled in the art will appreciate that even though the consumer may send an approval response indicating approval, the financial transaction may be denied by, for example, the financial institution. For example, the consumer's financial institution may deny the financial transaction for insufficient funds or credit.

Alternatively, the consumer may decide to deny the financial transaction. In such a scenario, the approval response (i.e., denial message) indicates denial of the financial transaction. Thus, the financial transaction is denied.

The following is an example in accordance with one or more embodiments of the invention. This example is not intended to limit the scope of the invention. In the following example, consider the scenario in which the consumer is a business. The approval request is to be sent to the owner of the business. The owner further defines a policy that states when the company's debit card is used at a restaurant, an approval request should be sent. Continuing with the example, the owner regularly sends employees on errands for stationary supplies and occasionally treats the employees to lunch. The employee uses a debit card of the business. If an employee, without authorization, uses the debit card at a restaurant to purchase lunch, the owner is notified and has the ability to deny the financial transaction. However, if the owner is at lunch with a client, the owner can pay with the debit card and expect the approval request before the waiter returns with the receipt to sign. Because the owner expects the approval request, the owner may discreetly approve of the financial transaction using the owner's mobile device without having to interrupt the conversation with the client. Thus, the policy serves to protect the owner from unscrupulous employees while at the same time preventing the owner from embarrassment of discussing the financial transaction with the financial institution on the restaurant's phone in front of the client.

FIG. 4 shows a flowchart of a method for the fraud prevention framework to process a financial transaction in accordance with one or more embodiments of the invention. Initially, the fraud prevention framework receives an authorization message requesting authorization to perform a financial transaction associated with a financial account (Step 231).

After receiving the authorization message, the transaction information is obtained from the authorization message in accordance with one or more embodiments of the invention (Step 233). The transaction information may include information about the merchant (e.g., name, address, store identifier, and/or any other information which may be used to identify the merchant), the amount of the financial transaction, the merchant category (e.g., food, hotel, etc.), the time and date on which the financial transaction was initiated, identification of the consumer, identification of the payment device or financial account the consumer is attempting to use for the financial transaction, and/or other such relevant information.

Next, a policy is obtained based on the transaction information (Step 235). In one or more embodiments of the invention, Step 235 includes obtaining all policies associated with the financial account and/or consumer and then determining which of the policies applies to (or is within the scope of) the financial transaction.

For example, if a parameter for a policy specifies that the policy governs financial transactions occurring between 10:00 PM and 5:30 AM, and the financial transaction is initiated at 1:30 AM as specified in the transaction information, then the policy may govern the financial transaction. In general, the policy parameters may function to limit the scope of the financial transactions to which a policy applies. In one or more embodiments of the invention, if any policy governing the financial transaction specifies to send an approval request to the consumer, the approval request is sent. In alternative embodiments of the invention, the most specific policy (i.e., the more parameters specified by the policy) governing the financial transaction is applied.

For example, consider the scenario in which a financial account has a general policy that specifies to notify the consumer regarding any purchases with an amount above two hundred dollars. The financial account may also have a specific policy that specifies to notify the consumer when a purchase at a hardware store exceeds seventy-five dollars. In the example, if the financial transaction is for a hundred dollars and does not occur at a hardware store, then the general policy is obtained and applied. Alternatively, if the financial transaction has an amount of a hundred dollars and occurs at a hardware store, then the specific policy is obtained and used.

Using the alternative approach in which the more specific policy is always applied, consider the scenario in which a financial account has a general policy that specifies to notify the consumer regarding any purchases with an amount above thirty dollars. The financial account may also have a specific policy that specifies to notify the consumer when a purchase at an electronic store exceeds seventy-five dollars. In the example, if the financial transaction is for forty dollars and does not occur at a hardware store, then the general policy is obtained and used. Alternatively, if the financial transaction has an amount of forty dollars and occurs at a hardware store, then the specific policy is obtained and used.

Next, a determination is made whether consumer authorization is required (Step 237). In one or more embodiments of the invention, authorization is required when the amount of the financial transaction exceeds the limit specified by the obtained policy. Specifically, in one or more embodiments of the invention, the policy triggers an approval request when the amount of the financial transaction is outside the limit set in the policy.

If consumer authorization is required, then an approval request is sent to the consumer's mobile device (Step 239). The approval request is formatted according to the requirements of the consumer's mobile device in accordance with one or more embodiments of the invention. For example, if the consumer's mobile device is a cellular telephone, and the notification is via a text message, then the approval request may be sent as a simple text message with only the merchant's name, amount, and a request to reply with approve or deny. Alternatively, if the consumer's mobile device is a personal digital assistant and the approval request is sent via email, then the approval request may include more information, such as amount, identification of the financial account, the name of the merchant.

Continuing with FIG. 4, the fraud prevention framework waits to receive a response. If a response is not received within a specified time (which may be set by the fraud prevention framework or the policy), then the fraud prevention framework may obtain a default policy for the financial account. Obtaining the default policy may be performed in a manner described above for obtaining a policy. Thus, the fraud prevention framework performs the action specified by the default policy. In one or more embodiments of the invention, rather than obtaining a default policy, each policy may have default action. In such embodiments, the default action is performed. For example, if the response is not received from the consumer, then the policy (not the default policy) may specify that the financial transaction is to be denied.

If a response is received from the consumer's mobile device (Step 241), then the determination is made about whether the financial transaction is authorized (Step 243). If the financial transaction is not authorized, then the fraud prevention framework denies the financial transaction (Step 245). Specifically, the fraud prevention framework informs the point of sale, using, for example, an intervening financial institution, to deny the financial transaction.

Alternatively, if the consumer sends an approval response that approves of the financial transaction, then the fraud prevention framework approves the financial transaction (Step 247). Thus, the financial transaction may be performed with the consumer's financial account. For example, the financial institution may approve of the financial transaction (Step 249). Thus, the financial institution debits the consumer's financial account by the amount specified by the financial transaction and the financial transaction is completed. Those skilled in the art will appreciate that completing the financial transaction may include the financial institution determining whether to authorize the financial transaction (for example, based on available funds in the financial account associated with the payment device used in the financial transaction). As such, completion of the financial transaction may include denial of authorization from the financial institution which maintains the financial account. Thus, while the consumer approved the financial transaction, the financial institution may still deny the financial transaction.

Figure 5A:
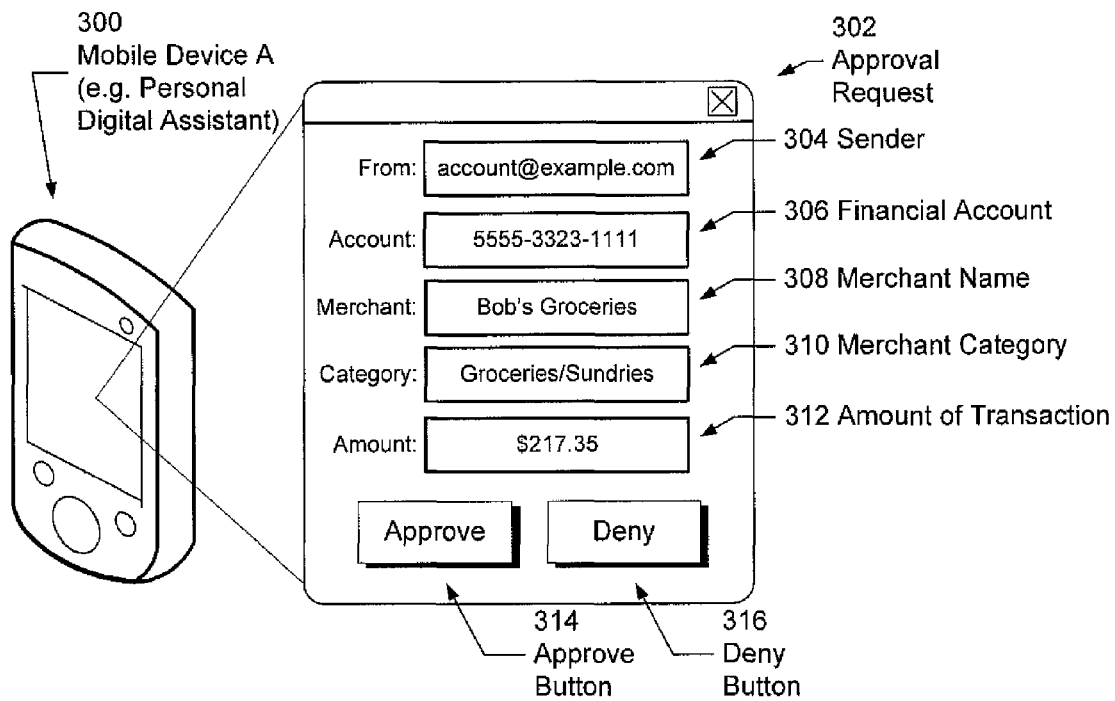
FIGS. 5A-5B show example consumer interfaces in accordance with one or more embodiments of the invention.
Figure 5B:
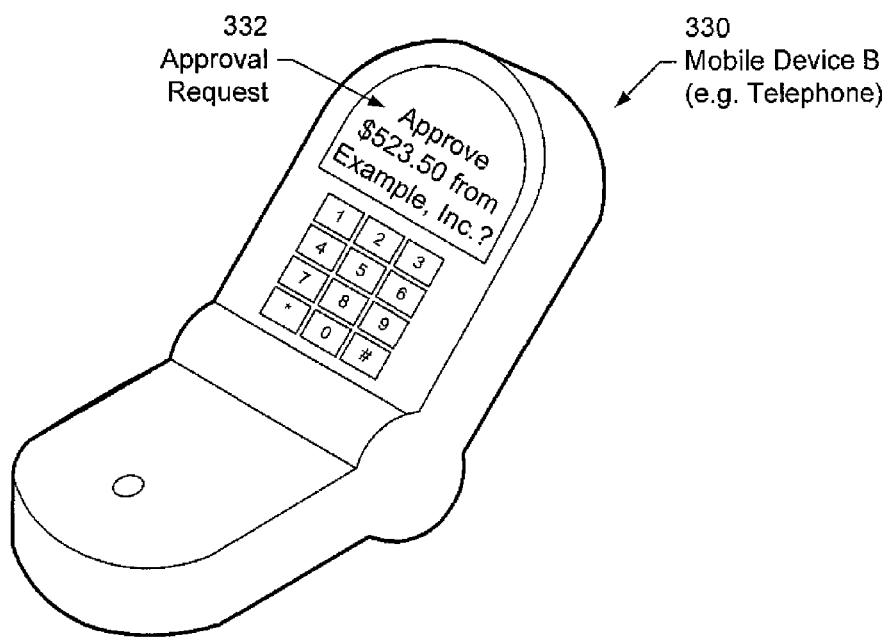

FIGS. 5A-5B show example consumer interfaces in accordance with one or more embodiments of the invention. These examples are not intended to limit the scope of the invention. FIG. 5A shows an example mobile device A (e.g., personal digital assistant) (300) with an approval request (302) in accordance with one or more embodiments of the invention. As shown in the example, the approval request (302) for a financial transaction may identify the sender (304) (e.g., the fraud prevention framework), an identifier of the financial account (306), a merchant name (308), a merchant category (310), and an amount of the financial transaction (312). Based on the information provided in the approval request (302), the consumer may determine whether to approve or deny the financial transaction. If the consumer approves of the financial transaction, then the consumer may select the approve button (314) in accordance with one or more embodiments of the invention. Alternatively, the consumer may deny the financial transaction by selecting the deny button (316) in accordance with one or more embodiments of the invention.

Rather than sending the approval request to a personal digital assistant of the consumer, the approval request may be sent to cellular telephone of the consumer. FIG. 5B shows an example mobile device B (e.g., telephone) (330) with an approval request (332) displayed as a text message in accordance with one or more embodiments of the invention. As shown in the example, the approval request may identify the amount of the financial transaction (e.g., $523.50) and the merchant name (e.g., "Example, Inc."). The consumer may send an approval response (not shown) as a text message with either "Approve" or "Deny", "Yes" or "No", or any other indicator of whether the financial transaction is approved or denied.

Figure 6:
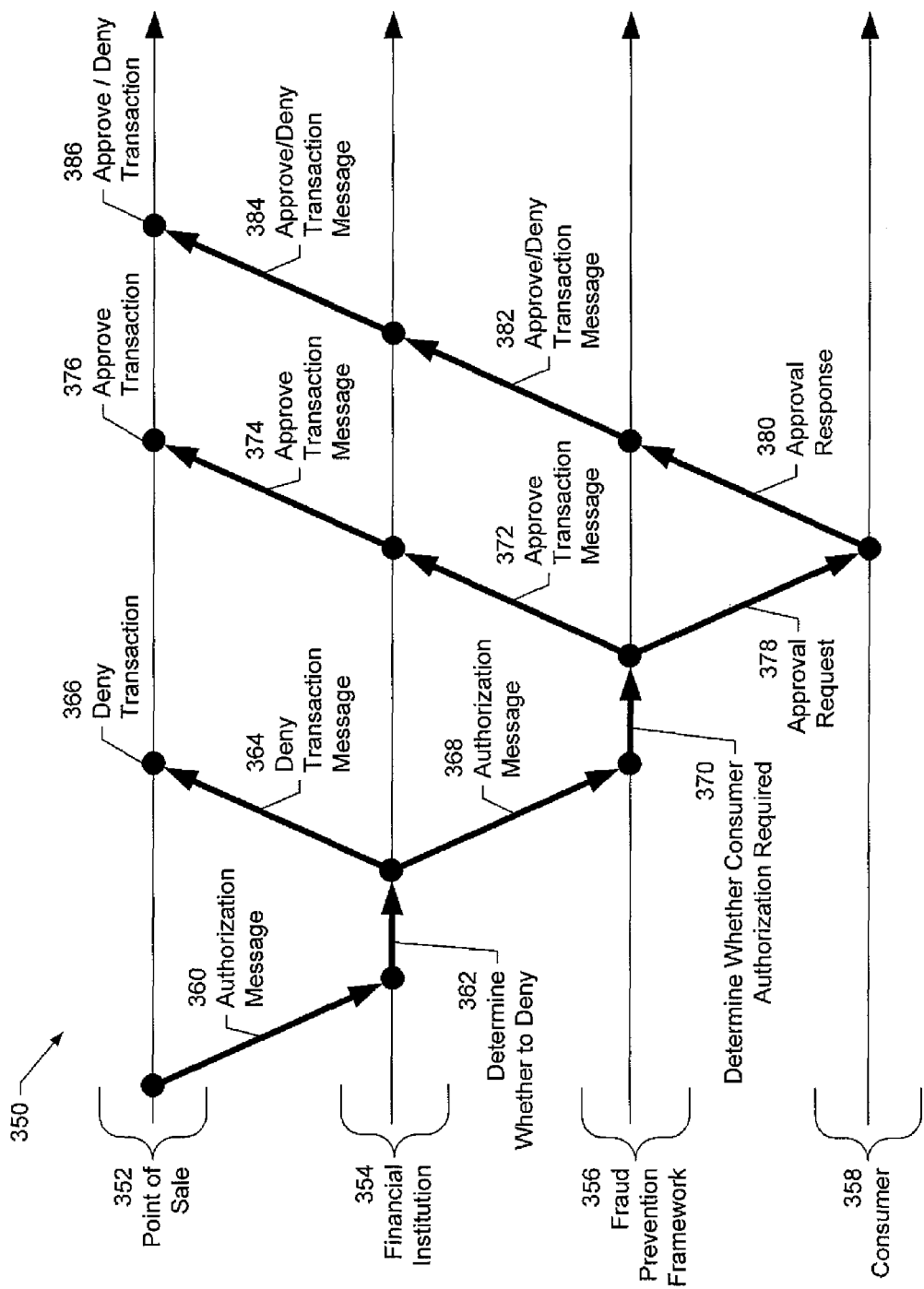
FIG. 6 shows example timing diagram in accordance with one or more embodiments of the invention.

FIG. 6 shows example timing diagram in accordance with one or more embodiments of the invention. The example timing diagram (350) shows example actions that are performed at/by the point of sale (352), the financial institution (354), the fraud prevention framework (356), and the consumer (358) in accordance with one or more embodiments of the invention. When an individual initiates a financial transaction with the financial account using a payment device, the point of sale (352) sends an authorization message (360) to a consumer's financial institution (354). One skilled in the art will appreciate that the authorization message may be sent via intermediate financial institutions such as the merchant's financial institution.

In response to the authorization message, the consumer's financial institution (354) may determine whether to deny the financial transaction (362). For example, if the consumer has insufficient funds in the financial account, then the financial transaction may be denied. In such scenario, the consumer's financial institution (354) sends a deny transaction message (364). Thus, the point of sale denies the transaction (366).

Alternatively, the consumer's financial institution (354) may determine that the financial transaction may proceed. Accordingly, the consumer's financial institution may send an authorization message (368) to the fraud prevention framework (356). In response, the fraud prevention framework (356) determines whether consumer authorization is required (370). Specifically, the fraud prevention framework (356) may access the policies associated with the consumer's financial account and determine whether any of the policies specify that the consumer should be notified of the financial transaction and approve of the financial transaction.

If consumer authorization is not required, then the fraud prevention framework (356) sends an approve transaction message (372) to the financial institution (354). The financial institution (354) debits the financial account of the consumer and sends an approve transaction message (374) to the point of sale (352). The point of sale (352) approves of the financial transaction (376) and the financial transaction is completed.

Alternatively, if consumer authorization is required, then an approval request (378) is sent to the consumer (358) in accordance with one or more embodiments of the invention. The consumer (358) may determine whether to approve or deny the financial transaction. Accordingly, in one or more embodiments of the invention, the consumer (358) sends an approval response (380) that approves or denies the financial transaction to the fraud prevention framework (356).

The fraud prevention framework (356) sends an approve transaction message or deny transaction message (382), depending on the approval response (380), to the financial institution (354). The financial institution (354) may debit the financial account if the message is an approve transaction message. Further, the financial institution (354) sends an approve transaction message or a deny transaction message (384) based on the message from the fraud prevention framework (356). Thus, the point of sale (352) approves or denies the financial transaction (386) according to the approval response (380) (i.e., approval or denial message) sent by the consumer (358).

The following is another example of one or more embodiments of the invention. The example is not intended to limit the scope of the invention. Turning to the example, consider the scenario in which the consumer has a policy that specifies that the consumer should be notified via text message to a cellular telephone when a retailer charges more than fifty dollars. On a road trip, the consumer purchases gas at a gas station. Unbeknownst to the consumer, the consumer's credit card numbers are stolen by a nefarious individual. The nefarious individual attempts to use the credit card numbers at a retail store (i.e., the merchant) to purchase a seventy-five dollar purse located in the same city as the gas station.

During the financial transaction, the point of sale device at the retail store sends the request to the merchant bank. The merchant bank forwards the request to the financial institution. The financial institution identifies the policy defined by the consumer. Because the financial transaction is above fifty dollars (i.e., seventy-five dollars), the financial institution notifies the consumer via a text message. The consumer receives the text message after the consumer has driven miles from the city of the retail store and the gas station. Naturally, the consumer denies the financial transaction. The financial institution may then notify the merchant that the financial transaction is denied. Thus, the merchant is able to deny the nefarious individual the ability to buy the purse. Further, embodiments of the invention allow the consumer to take proactive steps to prevent fraudulent transactions (i.e., the consumer does not need to dispute the financial transaction after it has occurred. In addition, the merchant is able to prevent the nefarious individual from illegally acquiring the purse with stolen credit card numbers.

Figure 7:
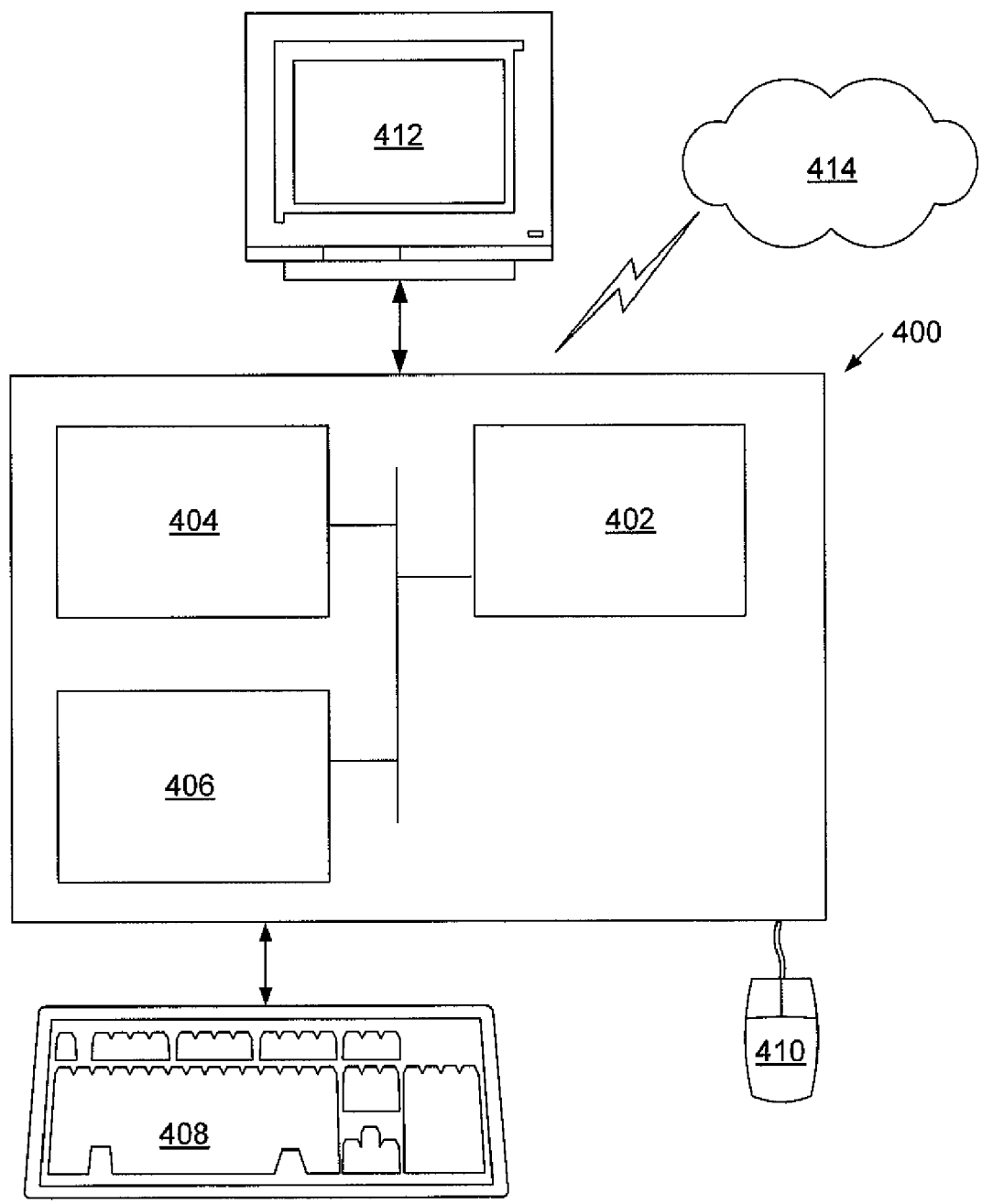
FIG. 7 shows a computer system in accordance with one or more embodiments of the invention.

The invention may be implemented on virtually any type of computer regardless of the platform being used. For example, as shown in FIG. 7, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (414) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., notification service, policy module, policy data store) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for approving a plurality of financial transactions, comprising:
   receiving, using a processor on a computer, a plurality of consumer-defined policies defined by a consumer for a financial account, wherein each the plurality of consumer-defined policies comprises a pair of rule sets, each rule set comprising a parameter specifying a merchant a limit specifying a maximum amount and an identifier of the financial account, and wherein each of the plurality of consumer-defined policies is used to notify the consumer of the existence of one of the plurality of financial transactions prior to completion of the one of the plurality of financial transactions;
   receiving, using the processor, first transaction information related to a first transaction of the plurality of financial transactions, wherein the first transaction information violates a first rule set of the pair of rule sets;
   after receiving the one of the plurality of consumer-defined policies, wherein the first rule set of the pair of rule sets is active and a second rule set of the pair of rule sets is inactive, using the processor for:
      accessing the one of the plurality of consumer-defined policies for the financial account based on a context of the first financial transaction;
      triggering a first approval request based on a determination that a merchant of the first financial transaction matches the parameter set by the first rule set consumer defined policy and that an amount of the first financial transaction is greater than the limit set by the first rule set
      sending the first approval request to a mobile device of the consumer;
      receiving a first approval response based on the first approval request from the mobile device of the consumer; and
      approving the first financial transaction based on the first approval response;
      in response to approving the first transaction that violates the first rule set, activating the second rule set and deactivating the first rule set based on a set of consumer-defined rules;
   receiving, using the processor, second transaction information related to the second financial transaction, wherein the second transaction information violates the second rule set;
   after receiving the one of the plurality of consumer-defined policies, wherein the second rule set is active and wherein the first rule set is inactive, using the processor for: accessing the one of the plurality of consumer-defined policies for the financial account based on a context of the second financial transaction;
      triggering a second approval request based on a determination that the merchant matches the parameter set by the second rule set and that an amount of the second financial transaction is greater than the limit set by the second rule set;
      sending the second approval request to the mobile device of the consumer;
      receiving a second approval response based on the second approval request from the mobile device of the consumer; and
   approving the second financial transaction based on the second approval response.

2. The method of claim 1, wherein the financial account is a checking account.

3. The method of claim 1, wherein the parameter set by the first rule set further specifies at least one selected from a group consisting of a category of merchant, a location of the first financial transaction, a type of financial transaction, and a time.

4. The method of claim 1, wherein accessing the one of the plurality of consumer-defined policies comprises determining whether the parameter set by the first rule set is satisfied using the first transaction information.

5. The method of claim 1, further comprising:
   identifying a category of goods sold by a merchant, wherein the first transaction information further comprises identification of the merchant, wherein the one of the plurality of consumer-defined policies is accessed based on the category of goods.

6. The method of claim 1, wherein the one of the plurality of consumer-defined policies is received from the consumer using a website.

7. The mobile device of claim 1, wherein the parameter set by the first rule set further specifies at least one selected from a group consisting of a category of merchant, a location of the first financial transaction, a type of financial transaction, and a time.

8. The method of claim 1, wherein the one of the plurality of consumer-defined policies is an adaptive policy that changes based on purchasing habits of the consumer.

9. A mobile device for approving a plurality of financial transactions, the mobile device comprising:
   a user interface configured to display approval of each of the plurality of financial transactions;
   memory configured to store software instructions; and
   a processor configured to execute the software instructions for interacting with the user interface, the user interface comprising: an amount field associated with each of the plurality of financial transactions comprised in an approval request; and
   a merchant field associated with each of the plurality of financial transactions comprised in the approval request,
   wherein a first approval request for a first financial transaction of the plurality of financial transactions is received when a first merchant matches a parameter set by a first rule set of a pair of rule sets of one of a plurality of consumer-defined policies and an amount is greater than a limit set by the first rule set, wherein the one of the plurality of consumer-defined policies and corresponding pair of rule sets are defined by a consumer prior to the first financial transaction, wherein each of the first rule set of the set of rule sets and the second rule set of the set of rule sets comprises the parameter specifying a merchant a limit specifying a maximum amount and an identifier of a financial account used to perform each of the plurality of financial transactions, wherein the one of the plurality of consumer-defined policies is used to notify the consumer, of the existence of the first financial transaction violating the first rule set prior to completion of the first financial transaction, wherein the one of the plurality of consumer-defined policy policies is accessed based on a context of the first financial transaction, and wherein the first rule set is active and the second rule set is inactive prior to the first financial transaction,
   wherein the consumer sends a first approval response with approval of the first financial transaction using the wherein the first financial transaction is approved, at a point of sale based on the first approval response;
   wherein, in response to approving the first financial transaction that violates the first rule set, the first rule set is deactivated and the second rule set is activated based on a set of consumer-defined rules;
   wherein a second approval request for a second financial transaction of the plurality of financial transactions is received when a second merchant matches a parameter set by the second rule set of the pair of rule sets of the one of a plurality of consumer-defined policies and an amount is greater than a limit set by the second rule set, wherein the one of the plurality of consumer-defined policies is used to notify the consumer of the existence of the second financial transaction violating the second rule set prior to completion of the second financial transaction, wherein the one of the plurality of consumer-defined policies is accessed based on a context of the second financial transaction, and wherein the first rule set is active and the second rule set is inactive prior to the second financial transaction,
   wherein the consumer sends a second approval response with approval of the second financial transaction, and
   wherein the second financial transaction is approved at a point of sale based on the second approval response.

10. The mobile device of claim 9, wherein the financial account is a checking account.

11. The mobile device of claim 9, wherein the one of the plurality of consumer-defined policies is an adaptive policy that changes based on purchasing habits of the consumer.

12. A system for approving a financial transaction, comprising:
   a consumer-defined policy data store comprising a plurality of consumer-defined policies, wherein each of the plurality of consumer-defined policies is defined by a consumer, wherein each of the plurality of consumer-defined policies comprises a pair of rule sets, each rule set comprising a parameter specifying a merchant a limit specifying a maximum amount, and an identifier of a financial account controlled by the consumer, and wherein each of the plurality of consumer-defined policies is configured to notify the consumer of the existence of one of the plurality of financial transactions prior to completion of the one of the plurality of financial transactions; and
   a consumer-defined policy module stored in memory configured to:
   receive first transaction information related to a first financial transaction of the plurality of financial transactions, wherein the first transaction information violates a first rule set of the pair of rule sets of one of the plurality of consumer-defined policies;
   access the one of the plurality of consumer-defined policies for the financial account based on a context of the first financial transaction, wherein the first rule set of the pair of rule sets is active and the second rule set of the pair of rule sets is inactive prior to the first financial transaction;
   trigger a first approval request based on a determination that a merchant of the first financial transaction matches the parameter set by the first rule set and that an amount of the first financial transaction is greater than a limit set by the first rule set;
   send the first approval request to a mobile device of the consumer;
   receive a first approval response based on the first approval request from the mobile device of the consumer;
   approve the first financial transaction based on the first approval response;
   in response to approving the first transaction that violates the first rule set, activate the second rule set of the set of rule sets and deactivate the first rule set of the set of rule sets based on a set of consumer-defined rules;
   receive second transaction information related to a second financial transaction of the plurality of financial transactions, wherein the second transaction information violates the second rule set of the pair of rule sets of the one of the plurality of consumer-defined policies;
   access the one of the plurality of consumer-defined policies for the financial account based on a context of the second financial transaction;
   trigger a second approval request based on a determination that a merchant of the second financial transaction matches the parameter set by the second rule set and that an amount of the second financial transaction is greater than a limit set by the second rule set;
   send the second approval request to a mobile device of the consumer;

receive a second approval response based on the second approval request from the mobile device of the consumer; and approve the second financial transaction based on the second approval response.

13. The system of claim 12, wherein the financial account is a checking account.

14. The system of claim 12, wherein the parameter set by the first rule set further specifies at least one selected from a group consisting of a category of merchant, a location of the first financial transaction, a type of financial transaction, and a time.

15. The system of claim 12, wherein accessing the one of the plurality of consumer-defined policies comprises determining whether the parameter set by the first rule set is satisfied using the first transaction information.

16. The system of claim 12, wherein the consumer-defined policy module is further configured to:

identify a category of goods sold by a merchant, wherein the first transaction information further comprises identification of the merchant, wherein the one of the plurality of consumer-defined policies is accessed based on the category of goods.

17. The system of claim 12, wherein the consumer-defined policy module is further configured to:

store the one of the plurality of consumer-defined policies in the consumer-defined policy data store, wherein the consumer defines the one of the plurality of consumer-defined policies using a website and wherein the one of the plurality of consumer-defined policies is received from the website.

18. The system of claim 12, wherein the one of the plurality of consumer-defined policies is an adaptive policy that changes based on purchasing habits of the consumer.

19. A computer readable medium comprising computer readable program code embodied therein for causing a computer system to:

receive a plurality of consumer-defined policy policies for a financial account, wherein the plurality of consumer-defined policies is defined by a consumer, wherein each of the consumer-defined policy comprises a pair of rule sets, each rule set comprising a parameter specifying a merchant a limit specifying a maximum amount and an identifier of the financial account, and wherein each of the consumer-defined policies is used to notify the consumer of the existence of one of a plurality of financial transactions prior to completion of the one of the plurality of financial transactions;

receive first transaction information related to a first financial transaction of the plurality of financial transactions, wherein the first transaction information violates a first rule set of the pair of rule sets; and after receiving the one of the plurality of consumer-defined policies, wherein the first rule set of the pair of rule sets is active and a second rule set of the pair of rule sets is inactive;

access the one of the plurality of consumer-defined policies for the financial account based on a context of the first financial transaction;

trigger first approval request based on a determination that a merchant of the first financial transaction matches the parameter set by the first rule set and that an amount of the first financial transaction is greater than a limit set by the first rule set;

send the first approval request to a mobile device of the consumer;

receive a first approval response based on the first approval request from the mobile device of the consumer; and approve the first financial transaction based on the first approval response;

in response to approving the first transaction that violates the first rule set, activate the second rule set and deactivating the first rule set based on a set of consumer-defined rules;

receive, using the processor, second transaction information related to the second financial transaction, wherein the second transaction information violates the second rule set;

after receiving the one of the plurality of consumer-defined policies, wherein the second rule set is active and wherein the first rule set is inactive, using the processor for:

access the one of the plurality of consumer-defined policies for the financial account based on a context of the second financial transaction;

trigger a second approval request based on a determination that the merchant matches the parameter set by the second rule set and that an amount of the second financial transaction is greater than the limit set by the second rule set;

send the second approval request to the mobile device of the consumer;

receive a second approval response based on the second approval request from the mobile device of the consumer; and approve the second financial transaction based on the second approval response.

20. The computer readable medium of claim 19, wherein the parameter set by the first rule set further specifies at least one selected from a group consisting of a category of merchant, a location of the first financial transaction, a type of financial transaction, and a time.

21. The computer readable medium of claim 19, wherein accessing the one of the plurality of consumer-defined policies comprises determining whether the parameter set by the first rule set is satisfied in the first transaction information.

* * * * *

UNITED STATES PATENT AND TRADEMARK OFFICE
CERTIFICATE OF CORRECTION

| | | |
|---|---|---|
| PATENT NO. | : 7,761,381 B1 | Page 1 of 1 |
| APPLICATION NO. | : 11/932325 | |
| DATED | : July 20, 2010 | |
| INVENTOR(S) | : Todd Matthew Fitch et al. | |

It is certified that error appears in the above-identified patent and that said Letters Patent is hereby corrected as shown below:

In Claim 9, Column 15 (line 40), the word "policy" should be deleted.

In Claim 9, Column 15 (line 46), please add a "," after the word "transaction" and delete "using the".

In Claim 19, Column 17 (line 41), the word "policy" should be deleted.

In Claim 19, Column 18 (line 4), the ";" after "inactive" should be a ":".

Signed and Sealed this

Fifth Day of October, 2010

David J. Kappos
*Director of the United States Patent and Trademark Office*